Figure 1:
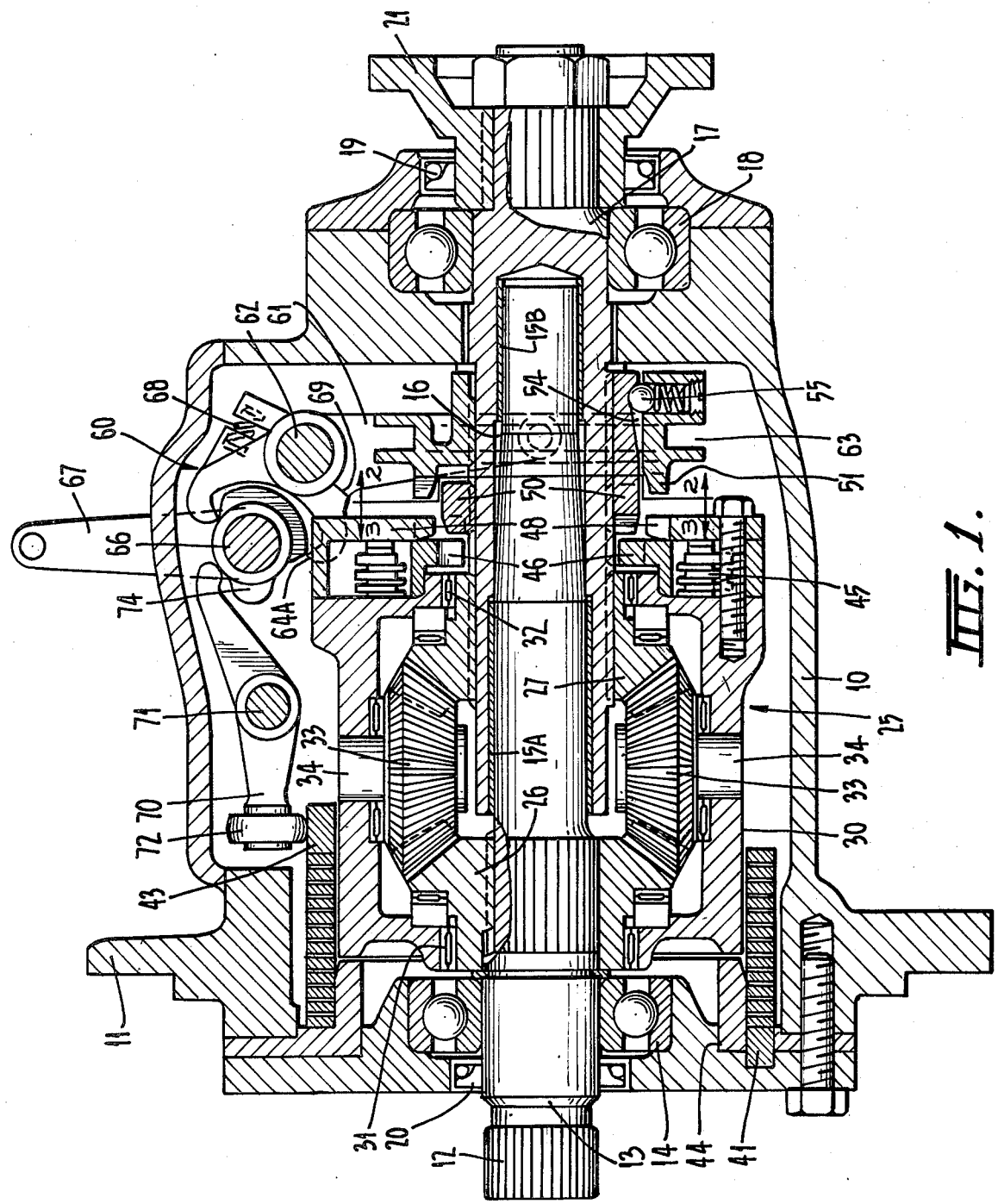
Figure 2:
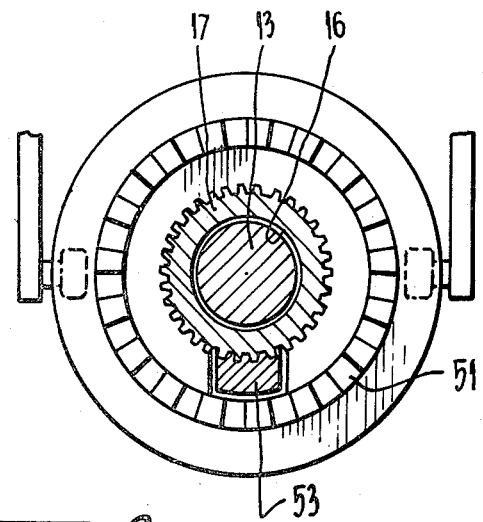
Figure 3:
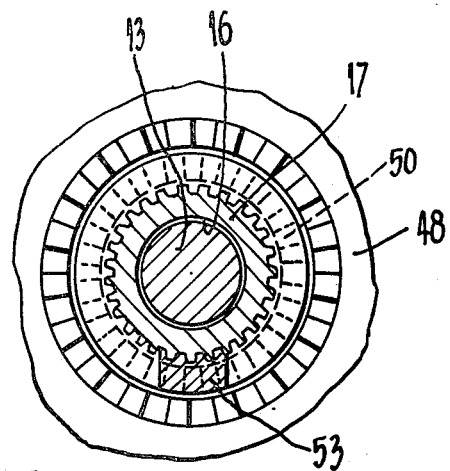

United States Patent [19]

Chamberlain

[11] 4,186,625
[45] Feb. 5, 1980

[54] REVERSIBLE TRANSMISSION

[76] Inventor: Alan H. Chamberlain, 95 Dow St., Port Melbourne, Victoria, Australia, 3207

[21] Appl. No.: 808,306

[22] Filed: Jun. 20, 1977

[30] Foreign Application Priority Data

Jun. 21, 1976 [AU] Australia ................................... 6344

[51] Int. Cl.² .............................................. F16H 3/44
[52] U.S. Cl. ........................................ 74/780; 74/777; 74/339; 74/792
[58] Field of Search .................. 74/792, 339, 780, 777

[56] References Cited

U.S. PATENT DOCUMENTS

| | | | |
|---|---|---|---|
| 2,018,794 | 10/1935 | Kremser | 74/780 |
| 2,168,862 | 8/1939 | DeLavaud | 74/780 |
| 2,209,980 | 8/1940 | Johnson | 74/780 |
| 2,456,614 | 12/1948 | Banker | 74/780 |

Primary Examiner—C. J. Husar
Assistant Examiner—James Yates
Attorney, Agent, or Firm—Wigman & Cohen

[57] ABSTRACT

An improved reversible transmission employing a planetary gear train between an input and output shaft so that when the carrier of the planetary gear train is free to rotate and the carrier is coupled to the output shaft the input and output shafts rotate in the same direction and when the carrier is held stationary the output shaft rotates in the opposite direction to the input shaft. The carrier is selectively coupled to the output shaft through a two stage coupling the first stage of which incorporates a friction drive device and is initially engaged and held so engaged while the second stage is operated to provide a direct mechanical coupling between the carrier and the output shaft.

1 Claim, 1 Drawing Figure

REVERSIBLE TRANSMISSION

This invention relates to a reversible transmission which incorporates a clutch mechanism for establishing the drive between the input and output shafts. The transmission is particularly suitable for use in marine applications such as pleasure craft and small cruisers.

A wide range of transmissions are available for use in marine application including simple dog and friction clutches up to hydraulically operated planetary gear systems. One such transmission is disclosed in U.S. Pat. No. 3,680,409 which incorporates a friction clutch to establish initial drive between the input and output shafts and a simple dog clutch which is subsequently engaged to establish the main drive. The transmission disclosed in that patent is quite effective in operation but is expensive to manufacture due to the number of components incorporated therein and the accurate machining required of these components. The high cost of manufacture is in part attributable to the friction clutch being selectively engageable and dis-engageable in the operation of the transmission.

It is the object of the present invention to provide a reversible transmission which is particularly suitable for marine applications and is yet of a simple construction and consequently less expensive to manufacture than that disclosed in the earlier patent. With this object in view there is provided a reversible transmission comprising a housing, an input and output shaft journalled co-axially in the housing, a planetary gear carrier journalled in the housing co-axial with the shafts, means including a friction coupling to selectively drive couple the output shaft to the planetary gear carrier, a brake operable to selectively lock the carrier stationary, a planetary gear train supported by the carrier and including an input gear coupled to the input shaft, said planetary gear train being arranged to drive the output shaft in the same direction as the input shaft when the carrier is drive coupled to the output shaft and to drive the output shaft in the opposite direction to the input shaft when the carrier is locked stationary, dog clutch means selectively operable to directly drive couple the carrier to the output shaft, and actuator means operable to effect in sequence firstly coupling of the input and output shafts through the carrier and friction coupling and thereafter while maintaining the drive through the friction clutch coupling the shafts through the carrier and dog clutch.

Conveniently, the planetary gear train includes an output gear coupled to the output shaft, with planetary gears intercoupling the input and output gears and the train. Accordingly, when the carrier is locked stationary by the brake means the drive between the input and output shafts is transmitted solely through the planetary gear train but with a change in direction of rotation between the input and output shafts. It will be appreciated that the gears of the planetary gear train are constantly in mesh and thus the input and output shafts are coupled therethrough, however, so long as the carrier is free to rotate independently of the shafts, and provided there is at least some resistance to rotation of the output shaft, the carrier will rotate with the planetary gears rolling on the output gear on the output shaft and thus the output shaft will remain stationary.

In the preferred embodiment, the friction coupling comprises a constantly engaged multi-plate clutch, with one element of the clutch coupled to the carrier and the other element to a drive member including drive teeth. A clutch element mounted on splines on the output shaft may selectively engage the drive teeth on the drive member to establish a drive coupling between the carrier and the output shaft through the friction clutch.

Preferably the dog clutch comprises one tooth member fixed to the carrier and the second tooth member direct coupled to the output shaft and slidable thereon into and out of engagement with the tooth member attached to the carrier. The brake means may be a conventional band type, but preferably is in the form of a torsion spring clutch having one end anchored to the housing and the other end selectively engageable with the portion of the outer surface of the carrier so that upon engagement therewith the spring will wrap on to the surface and frictionally lock the carrier against rotation relative to the housing.

The clutch element carrying the teeth which engage the drive member of the multi-plate clutch and the movable toothed member of the dog clutch may be arranged in concentric relation on the output shaft and coupled thereto to rotate in unison with the output shaft. The dog clutch member and the clutch element are axially slidable relative to one another so as to move axially in unison until the clutch element engages the teeth on the drive member of the multi-plate clutch to thereby establish the initial drive to the output shaft, whereupon axial movement of said clutch element will cease but the dog clutch member will continue to move axially to engage the dog clutch member attached to the carrier.

It will be appreciated that the operation of the above described transmission results in the output shaft being coupled to the input shaft initially through the multi-plate friction clutch so as to achieve a smooth coupling action with the friction clutch absorbing the initial shock loading. Also the friction clutch is engaged when the input shaft is rotating at a comparatively slow speed and the carrier is rotating at half that speed and is thus not required to transmit the full power developed at higher speeds and accordingly can be of a small and simple construction. Once input and output shafts are coupled through this friction clutch the dog clutch may then be engaged without any shock loading as the two shafts are rotating at substantially the same speed. Thereafter, the drive is transmitted wholly through the dog clutch which can readily be designed to take the full power and yet remain simple and compact.

It will be appreciated that once the dog clutch is engaged there is in fact a direct coupling between the input and output shafts and hence they will rotate in the same direction. In order to obtain reverse drive the friction clutch and dog clutch are not employed, and drive is transmitted from the input gear to the output gear of the planetary gear train with the planetary gear carrier locked stationary. In this arrangement the drive is transmitted between the input and output gears through the planetary gears and consequently there is a change in direction of rotation whereby the output shaft will be driven in the opposite direction to the input shaft.

The invention will be more readily understood from the following description of one practical arrangement of the transmission as illustrated in the accompanying drawing which is a longitudinal axial section of the transmission.

Referring now to the drawing, the transmission comprises a housing 10 having a mounting flange 11 adapted to be secured to the motor or engine with the splined end 12 of the input shaft 13 engaging with a splined recess in the shaft or fly wheel of the motor. The input shaft 13 is supported in the bearing 14 and in the forward end of the housing, and by two bushes 15 and 15A located within the bore 16 in the output shaft 17. The output shaft 17 is co-axial with the input shaft 13 and is supported by the bearing 18 at the rear end of the housing 10. Oil seals 19 and 20 are provided at each end of the housing to co-operate with the input shaft 13 and the flange coupling 21 carried by the output shaft 17.

The planetary gear system 25 has an input gear 26 splined to the input shaft 13 and an output gear 27 splined to the output shaft 17. The planetary gear carrier 30 is supported on the bearings 31 and 32 on the input and output gears 26 and 27 respectively, so that the gear carrier 30 may rotate about the common axis of the input and output shafts 13 and 17. The planetary gear carrier 30 has four equally spaced planetary gears 33 (only two of which are shown in the drawing) journalled on respective shafts 34 secured to the planetary gear carrier 30. The planetary gears 33 meshing with the input and output gears 26 and 27 respectively. The torsion spring clutch 40 has one end 41 anchored to the housing 10 and a plurality of co-axial coils surrounding portion of the cylindrical external surface of the gear carrier 30 and they cylindrical spigot 44 on the housing 10. The other end of the spring 40 is secured to the pad 43 which may be selectively engaged and disengaged with the external surface of the carrier 30 as hereinafter described. When the pad 43 is engaged with the surface of the carrier 30 the pad 43 moves with the carrier 30 to cause the spring 40 to tightly wrap around the cylindrical surface of the carrier and the cylindrical spigot to frictionally lock onto both so that the carrier 30 is locked stationary with the housing 10.

The multi-plate friction clutch 45 is mounted to the rear end of the planetary carrier 30 to provide a coupling between the planetary carrier 30 and the internally toothed low speed drive ring 46. The friction clutch 45 is permanently engaged so that, apart from minor slippage which may occur, the low speed drive ring 46 rotates with the carrier 30. The multi-plate friction clutch 45 is not intended to transmit maximum power from the input shaft to the output shaft as will be explained hereinafter, and accordingly is only a relatively light clutch. The high speed drive ring 48 is rigidly secured to the planetary gear carrier 30 and is also provided with an internal tooth formation.

The slow speed and high speed tooth clutch elements 50 and 51 respectively are each mounted on splines provided on the output shaft 17 and are each axially slidable on the output shaft 17. The slow speed clutch element 50 has a rearwardly extending tongue 53 which extends into respective slots in the high speed clutch element 51. The tongue 53 has a ramp 54 on the external surface thereof, and the spring loaded balls 55 carried by the high speed clutch element 51 engage the respective ramp 54. The spring loaded balls 55 co-operate with ramp 54 to produce sufficient friction so that as long as the slow speed clutch element 50 is free to move on the splines of the output shaft, the high speed and low speed clutch elements move together.

The actual operation of the transmission will now be described independent of the actuating mechanism which will be described in more detail later. When the motor is running the input shaft 13 will rotate and the friction load which will normally be acting on the output shaft 17 will prevent the output shaft from rotating. Accordingly the output gear 17 of the planetary gear train is stationary and thus the planetary gear carrier 30 and hence also the planetary gears 33 will rotate with the input shaft 13 at half the speed of the input shaft.

In order to establish a forward drive connection the output shaft 17 is required to rotate in the same direction as the input shaft 13. Upon operation of the actuating mechanism which will be described later, the high speed clutch element 51 is moved forward on the splines of the output shaft 17 towards the planetary gear carrier 30. Due to the operation of the spring loaded balls 55 and ramp 54, the slow speed gear element 50 also moves forward. As a result of this forward movement the teeth of the slow speed clutch element engage the teeth of the slow speed drive ring 46 so that a drive connection is established between the input shaft and the output shaft via the planetary gear carrier 30, the friction clutch 45, the slow speed drive ring 46 and the slow speed clutch element 50. It will be appreciated that this engagement takes place when the motor is running at normal idling speed and accordingly the power being transmitted is comparatively low and the friction clutch 45 can effectively transmit all the torque available.

When the slow speed clutch element 50 is engaged with the slow speed drive ring 46, there is resistance to further axial movement of the slow speed clutch element 50 in the axial direction. Accordingly on continued operation of the actuating mechanism the high speed clutch element now commences to move in axial direction relative to the slow speed clutch element and the balls 55 will move up the ramp 54. This movement of the high speed clutch element 51 will bring the teeth thereof into engagement with the teeth of the high speed drive ring 48 so that the output shaft 17 is now directly coupled to the planetary gear carrier 30 independently of the multi-plate clutch 45. There is therefore a direct mechanical drive path between the input shaft 13 and the output shaft 17 and full power may be transmitted therebetween. Also it will be noted that the input shaft and output shaft will now rotate in the same direction.

In order to disengage the drive the high speed clutch element is moved axially in the opposite direction so that the high speed clutch element is initially disengaged from the high speed drive ring 45 and upon the balls 55 reaching the lower end of the ramp 54 the slow speed clutch element 46 is then axially moved to disengage from the slow speed drive ring 46 and hence the output shaft 17 is then disconnected completely from the input shaft 13.

In order to obtain reverse drive, that is, the output shaft 17 rotating in the opposite direction to the input shaft 13, the pad 43 is engaged with the external surface of the planetary carrier 30 so that the spring 40 is wrapped around the planetary gear carrier and the cylindrical spigot 44 to hence lock these two components together and prevent rotation of the planetary gear carrier 30. With the planetary gear carrier stationary, drive is transmitted from the input shaft to the input gear 26 then through the planetary gears 33 to the output gear 27 and hence to the output shaft 17. This transmission of the motion through the gear train will cause a change in direction of motion between the input gear 26 and the output gear 27 and hence the output shaft 17 will rotate in the opposite direction to the input shaft 13.

The mechanism which actuates the transmission to select either forward or reverse drive is indicated generally at 60 and comprises a conventional clutch fork member 61 which is pivotally supported on the shaft 62, and has trunnions on each of the arms of the fork engaging in the annular groove 63 in the high speed clutch element 51. The "C" shaped member 64 is also pivotally mounted on the shaft 62 and operates in the manner of a bell crank having respective arm terminal portions 64A and 64B. The cam member 65 is attached to the shaft 66 journalled in the housing 10 with the shaft 66 carrying the actuating arm 67 externally of the housing 10.

As shown in the drawing the actuating arm 67 is in the neutral position with both the high speed and low speed clutch elements 51 and 50 disengaged. If the actuating arm 67 is moved in an anti-clockwise direction the cam 65 will cooperate with the terminal portion 64B of the bell crank 64 to cause the bell crank to move in a clockwise direction about the shaft 62. This movement of the bell crank 64 will effect a corresponding movement of the fork 61 in a clockwise direction in order to move the high speed and low speed clutch elements 51 and 50 axially along the shaft towards the respective drive rings 46, 48.

It will be noted that a compression spring 68 is interposed between the bell crank 64 and the fork 61 so that, in the event that during the engaging operation, the teeth on the clutch element are not aligned with the teeth on the drive ring and therefore abut rather than moving immediately into mesh therewith, the engaging movement of the actuating arm 67 and bell crank 64 may be completed by compressing of the spring 68. The force applied by the compression of the spring 68 will complete the engagement of the teeth of the clutch element with the drive ring upon sufficient relative rotation therebetween to permit the teeth to move into mesh.

The compression spring 68 has a further function of permitting over-run between the teeth on the clutch elements and the teeth on the driving rings. These teeth are of a ratchet form so that they only drive in one direction and accordingly if the output shaft over-runs the input shaft such as during a sudden drop in motor speed, the ratchet action will come into operation causing the clutch elements to undergo a slight reciprocating movement on the splines of the output shaft and this movement is accommodated by the spring 68 so that the bell crank 64 and actuating arm 67 may remain in the selected position.

In order to disengage the drive the actuating arm 67 is returned to the neutral position as shown in the drawing and the bell crank 64 also returns to the neutral position by the terminal portion 64A moving up the ramp of the cam 65 whilst the terminal portion 64B moves down the ramp at the opposite end of the cam. This movement of the bell crank 64 is transmitted to the fork 61 due to the abutment therebetween at 69. During the disengaging movement the balls 55 move down the ramp 54 to the lower point thereof and thus the withdrawal movement of the high speed clutch element 51 is transmitted to the low speed clutch element 46 so that disengagement of both the clutch elements is achieved.

In order to operate the torsion spring clutch 40 to obtain a reversal in rotation between the input and output shafts there is provided the lever 70 pivotally mounted on the shaft 71 supported in the housing 10 which carries at one end a roller 72 which engages the pad 43 of the torsion spring clutch. At the other end the lever 70 co-operates with the cam 74 which is integral with the cam 65. Accordingly when the actuating arm 67 is moved in a clockwise direction from the neutral position the cam 74 will cause a pivotal movement of the lever 70 so that the roller 72 will force the pad 43 into frictional engagement with the cylindrical surface of the planetary carrier 30. This frictional engagement of the pad with the planetary carrier will cause the torsion spring clutch 40 to be wrapped tightly onto the carrier 30 and spigot 41 in order to lock the carrier against rotation. It will be appreciated that when the actuating arm 67 is moved in the clockwise direction to select the reverse drive the terminal portion 64A of the bell crank will move along the profile of the cam 65 so as to positively prevent movement of the bell crank and fork 61 in a direction to engage the clutch elements with the drive rings. Accordingly there is a positive interlock so that it is impossible for forward and reverse gear to be selected at the same time.

I claim:
1. A reversible transmission comprising:
a housing;
an input shaft and an output shaft journalled co-axially in the housing;
a planetary gear system including an input gear coupled to the input shaft, an output gear coupled to the output shaft, planetary gears coupling said input and output gears, and a planetary gear carrier rotatably supported co-axially with the shafts and carrying the planetary gears;
brake means operable for selectively locking the carrier against rotation which provides reverse drive and releasable coupling means for selectively drive-coupling the carrier to the output shaft which provides forward drive;
said releasable coupling means including;
first clutch means for coupling the carrier to the output shaft and including a friction drive, and
second clutch means for mechanically coupling the carrier to the output shaft;
actuating means operable for initially engaging the first clutch means and thereafter engaging the second clutch means while maintaining the first clutch means engaged;
said first clutch means comprising:
a dog clutch having a driven toothed member mounted co-axially on the output shaft to rotate therewith and
a drive toothed member coupled to the carrier by a constantly engaged multi-plate friction clutch;
said second clutch means comprising:
two toothed dog clutch elements, one secured directly to the carrier and the other mounted co-axially on the output shaft to rotate therewith;
said driven toothed member and said other toothed dog clutch element being axially slidable together on the output shaft to engage the first clutch means; and
said other toothed dog clutch element being axially slidable on said driven toothed member to engage the second clutch means.

* * * * *